(12) United States Patent
Kostepen

(10) Patent No.: US 9,923,654 B2
(45) Date of Patent: *Mar. 20, 2018

(54) VEHICLE MEDIA AND COMMUNICATIONS ACCESS

(71) Applicant: Panasonic Automotive Systems Company of America, Division of Panasonic Corporation of North America, Peachtree City, GA (US)

(72) Inventor: Hakan Kostepen, Los Gatos, CA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/208,487

(22) Filed: Jul. 12, 2016

(65) Prior Publication Data

US 2016/0323052 A1   Nov. 3, 2016

Related U.S. Application Data

(63) Continuation of application No. 14/108,574, filed on Dec. 17, 2013, now Pat. No. 9,420,637, which is a continuation of application No. 13/853,287, filed on Mar. 29, 2013, now Pat. No. 8,660,478, which is a continuation of application No. 12/653,581, filed on Dec. 16, 2009, now Pat. No. 8,433,238.

(51) Int. Cl.

| | |
|---|---|
| *H04H 20/71* | (2008.01) |
| *H04H 20/74* | (2008.01) |
| *H04H 60/09* | (2008.01) |
| *H04H 40/00* | (2009.01) |
| *H04H 40/90* | (2008.01) |
| *H04N 7/20* | (2006.01) |
| *H04W 88/10* | (2009.01) |
| *G07C 5/00* | (2006.01) |
| *G07C 5/08* | (2006.01) |
| *H04L 29/06* | (2006.01) |
| *H04W 84/12* | (2009.01) |

(52) U.S. Cl.
CPC ............ *H04H 40/90* (2013.01); *G07C 5/008* (2013.01); *G07C 5/08* (2013.01); *H04L 65/4069* (2013.01); *H04N 7/20* (2013.01); *H04W 88/10* (2013.01); *H04W 84/12* (2013.01)

(58) Field of Classification Search
CPC ..................................................... H04H 40/90
USPC .......................... 455/414.1, 3.01, 3.06, 3.05
See application file for complete search history.

(56) References Cited

U.S. PATENT DOCUMENTS

| | | | |
|---|---|---|---|
| 6,542,758 B1 * | 4/2003 | Chennakeshu | B60R 11/0241 455/41.2 |
| 8,019,298 B2 * | 9/2011 | Reynolds | H04H 40/90 455/152.1 |
| 8,538,388 B2 * | 9/2013 | De Luca | H04W 8/18 370/341 |

(Continued)

*Primary Examiner* — Tilahun B Gesesse
(74) *Attorney, Agent, or Firm* — Laurence S. Roach, Esq

(57) ABSTRACT

Methods, systems, devices and/or apparatus relate to vehicle media and communications systems and/or providing communications network and/or satellite network access in a vehicle. Specifically, the disclosed methods, systems, devices and/or apparatus relate to providing access to data, communications and/or satellites using a modular vehicle media and communications system.

20 Claims, 5 Drawing Sheets

(56) References Cited

U.S. PATENT DOCUMENTS

| | | | |
|---|---|---|---|
| 8,738,693 B2* | 5/2014 | Julia | H04N 1/00137 |
| | | | 709/204 |
| 8,738,730 B2* | 5/2014 | Julia | H04L 41/0806 |
| | | | 709/217 |
| 8,766,795 B1* | 7/2014 | Causey | G06Q 30/0645 |
| | | | 340/3.7 |
| 8,787,164 B2* | 7/2014 | Julia | G06F 17/30017 |
| | | | 370/232 |
| 8,819,140 B2* | 8/2014 | Julia | H04L 67/16 |
| | | | 370/328 |
| 2005/0215194 A1* | 9/2005 | Boling | H04B 7/18523 |
| | | | 455/3.02 |

* cited by examiner

VEHICLE MEDIA AND COMMUNICATIONS ACCESS

CROSS-REFERENCE TO RELATED APPLICATION

This application is a continuation of U.S. patent application Ser. No. 14/108,574, filed on Dec. 17, 2013, now U.S. Pat. No. 9,420,637, issued on Aug. 16, 2016, which is a continuation of U.S. patent application Ser. No. 13/853,287, filed on Mar. 29, 2013, now U.S. Pat. No. 8,660,478, issued on Feb. 25, 2014, which is a continuation of U.S. patent application Ser. No. 12/653,581, filed on Dec. 16, 2009, now U.S. Pat. No. 8,433,238, issued on Apr. 30, 2013, the disclosures of which are hereby incorporated by reference in their entireties for all purposes.

BACKGROUND OF THE INVENTION

Internet access is a significant part of the content flow in today's society. Content may be stored, accessed and/or modified via Internet-based services. In-vehicle Internet access is becoming an increasingly important part of people's lifestyles. However, problems with this paradigm shift include:
  The Internet is constantly changing and driven by consumer electronics/mobile electronics.
  Consumer and/or mobile electronics and in-vehicle electronics typically have different development cycles and requirements.
  Traditionally, vehicle entertainment and/or information systems (including state of the art functions and/or features) have been embedded into a vehicle architecture, making it difficult to keep up with changes/demands driven by consumer and/or mobile electronics.
  Vehicle Internet access may also require a safe access method based on dynamic driving conditions.

Therefore, vehicle users may desire a solution to enhance vehicle Internet access capabilities and, ultimately, provide a modular vehicle media and/or communications system with easy upgrading capabilities. Further, vehicle users may desire that such system include safety elements to provide operation of the system only when the vehicle is in a specific operating and/or non-operating state.

SUMMARY OF THE INVENTION

The vehicle media and communications access concept of the invention enables the separation of quickly changing infotainment functions from infotainment functions that change slowly or not at all. Functions that have historically changed slowly include AM/FM/XM radio, amplifiers, and digital signal processors. Functions that have historically changed quickly include wireless connectivity, and interfacing with mobile/portable devices. The invention may enable the in-vehicle hardware and software associated with quickly changing functions to also change quickly in response.

According to one embodiment of the invention, the quickly changing functions may be physically partitioned from the slowly changing functions, thereby facilitating the changing or replacement of hardware associated with the quickly changing functions. For example, a separate physical box or infotainment device may be used to contain all hardware/software associated with slowly changing vehicle infotainment functions. This box may contain hardware/software associated with AM/FM/XM as well as amplifiers and digital signal processors.

Another separate detachable and/or modular device may contain hardware/software associated with functions that change with consumer electronics product cycles, or that change from region-to-region. This detachable/modular device may also include brand system elements such as the skin of the detachable/modular device, a display of a particular size, and/or human-machine interface (HMI) elements. This detachable/modular device may be replaced and/or upgraded every two to three years as needed to match the product cycle of consumer electronics. The detachable/modular device may be carried from vehicle to vehicle and may be a personal device to carry personalization parameters from vehicle to vehicle. The detachable/modular device may also be used outside the vehicle to provide location based services/applications based on mode/place/time. Depending on the OEM requirements, the detachable/modular device may be upgraded by the automobile dealers every two to three years or as needed as new functions/features become available.

In another embodiment, the invention provides a brand-specific detachable device which can be used at all modes/places/times, and which also ties the vehicle brand into a lifestyle brand content. This may enable sponsor-generated content and/or sponsor-generated content to be provided for the user based on mode/place/time. This may also enable a car OEM to be part of this business equation and evolving new business model.

According to another embodiment of the invention, complex functions/features may also require a human machine interface to be dynamic and to be adjusted by vehicle parameters. The dynamic human machine interface may interpret vehicle conditions and optimize the Driver User Interface based upon the interpretation. The dynamic human machine interface may be defined based on the vehicle parameters of vehicle speed, transmission state, and the state of the hand brake, for example.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION OF THE INVENTION

Figure 1:
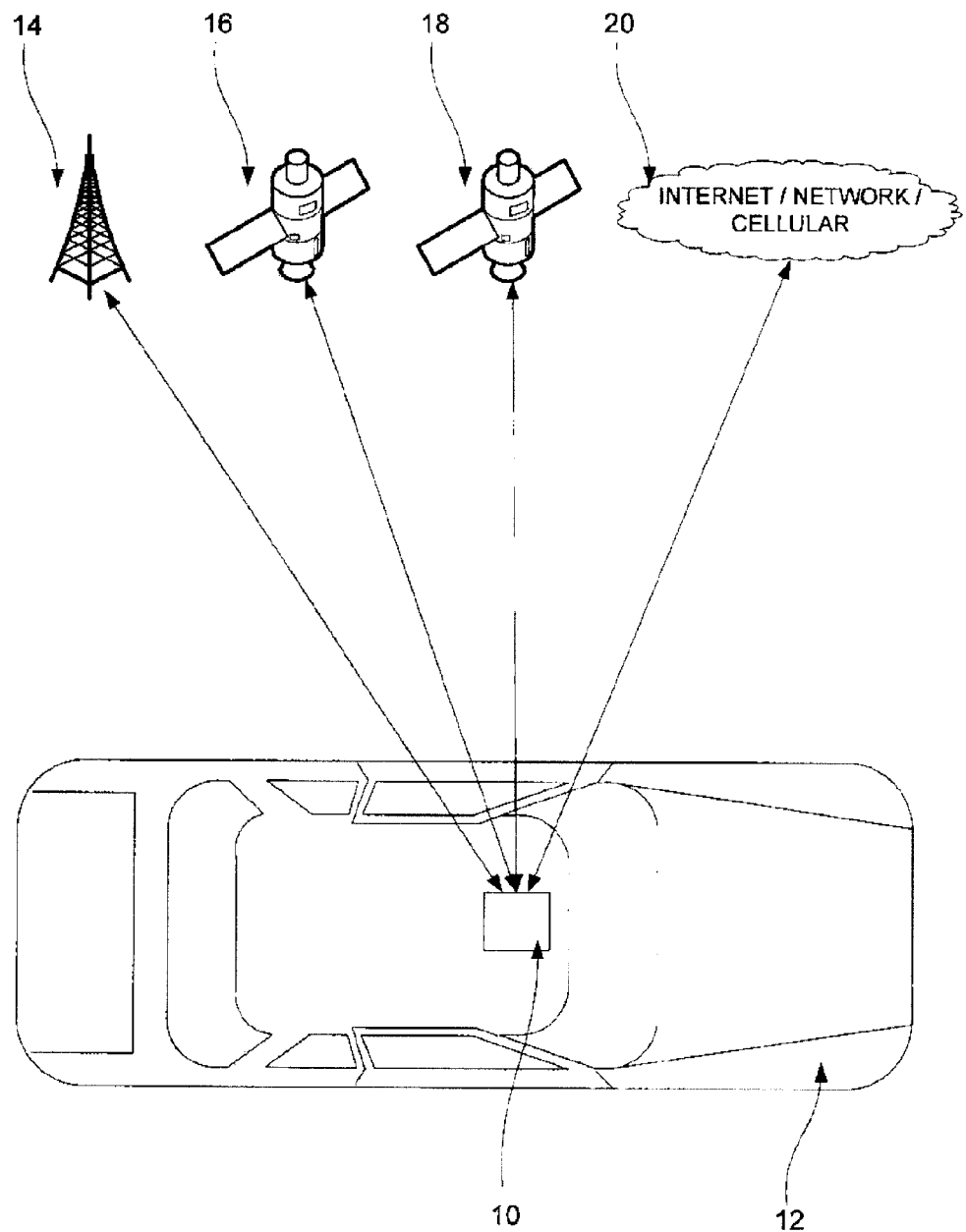
FIG. 1 is a diagram depicting an example embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn to methods, systems, devices and/or apparatus related to vehicle media and communications system and/or providing communications network and/or satellite network access in a vehicle. Specifically, the disclosed methods, systems, devices and/or apparatus relate to providing access to data, communications and/or satellites using a modular vehicle media and communications system.

While much of the present disclosure depicts and/or describes automobile-based example embodiments, it is certainly within the scope of the present disclosure that embodiments may be implemented in any vehicle including, without limitation, motorcycles and other road-based vehicles, all-terrain vehicles and other off-road-based vehicles, boats and other water-based vehicles, airplanes and other air-based vehicles, and the like.

In an example embodiment (as depicted in FIG. 1), vehicle media and communications system 10 is provided in an example environment in which system 10 may be implemented. Such a system 10 may located within vehicle 12. System 10 may be adapted to receive radio signals (including terrestrial radio signals 14 and/or satellite radio signals 16, for example). System 10 may be further adapted to communicate with and/or receive data and/or signals from a satellite network (including video satellite 18 and/or communications network 20, for example).

Figure 2:
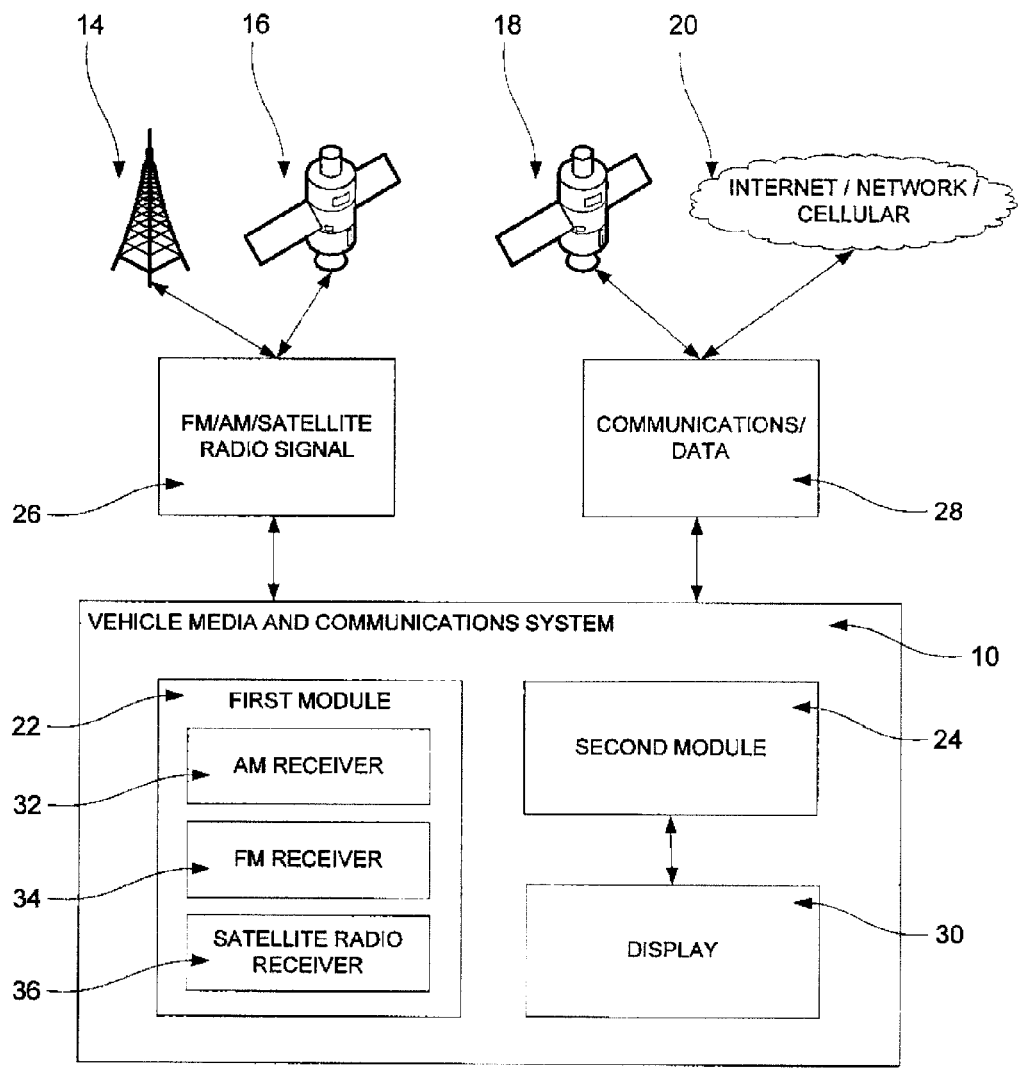
FIG. 2 is a diagram depicting another example embodiment of the present invention.

In an example embodiment (as depicted in FIG. 2), vehicle media and communications system 10 is provided. Such system 10 may be adapted to receive radio signals 26 (including terrestrial radio signals 14 and/or satellite radio signals 16, for example). System 10 may be further adapted to communicate with and/or receive communications/data and/or signals 28 from satellite network 18, communications network and/or cellular network 20 (including video satellite 18 and/or Internet 20, cellular network 20 and/or communications network 20, for example). System 10 may include first module 22, second module 24 and display 30. First module 22 may include amplitude modulation (AM) receiver 32, frequency modulation (FM) receiver 34 and/or satellite radio receiver 36. Second module 24 may be adapted to communicate with communications network 20 and/or satellite network 18. Second module 24 may be further adapted to output communications/data 28 from communications network 20 and/or satellite network 18.

In one embodiment, first module 22 may include amplification component 38 (FIG. 4) adapted to amplify the media file and/or media signal. The first module 22 may also include digital signal processing component 40 adapted to process the media file and/or media signal.

In one embodiment, second module 24 may include a compact disc (CD) player, an MP3 player, a digital video disc (DVD) player, a high-definition video player, a wireless network adapter, a cellular network adapter, a satellite communications network adapter, a satellite video receiver and/or a global positioning system (GPS) receiver.

In one embodiment, communications network 20 may include the Internet, a local area network (LAN), a wireless LAN (WLAN), a wide area network (WAN), a global area network (GAN), a wireless fidelity (Wi-Fi) network, a Worldwide Interoperability for Microwave Access (WiMAX) network, a Global System for Mobile (GSM) network and/or a code division multiple access (CDMA) network. Satellite network 18 may include a satellite communications network, a satellite video network and a GPS network.

Figure 4:
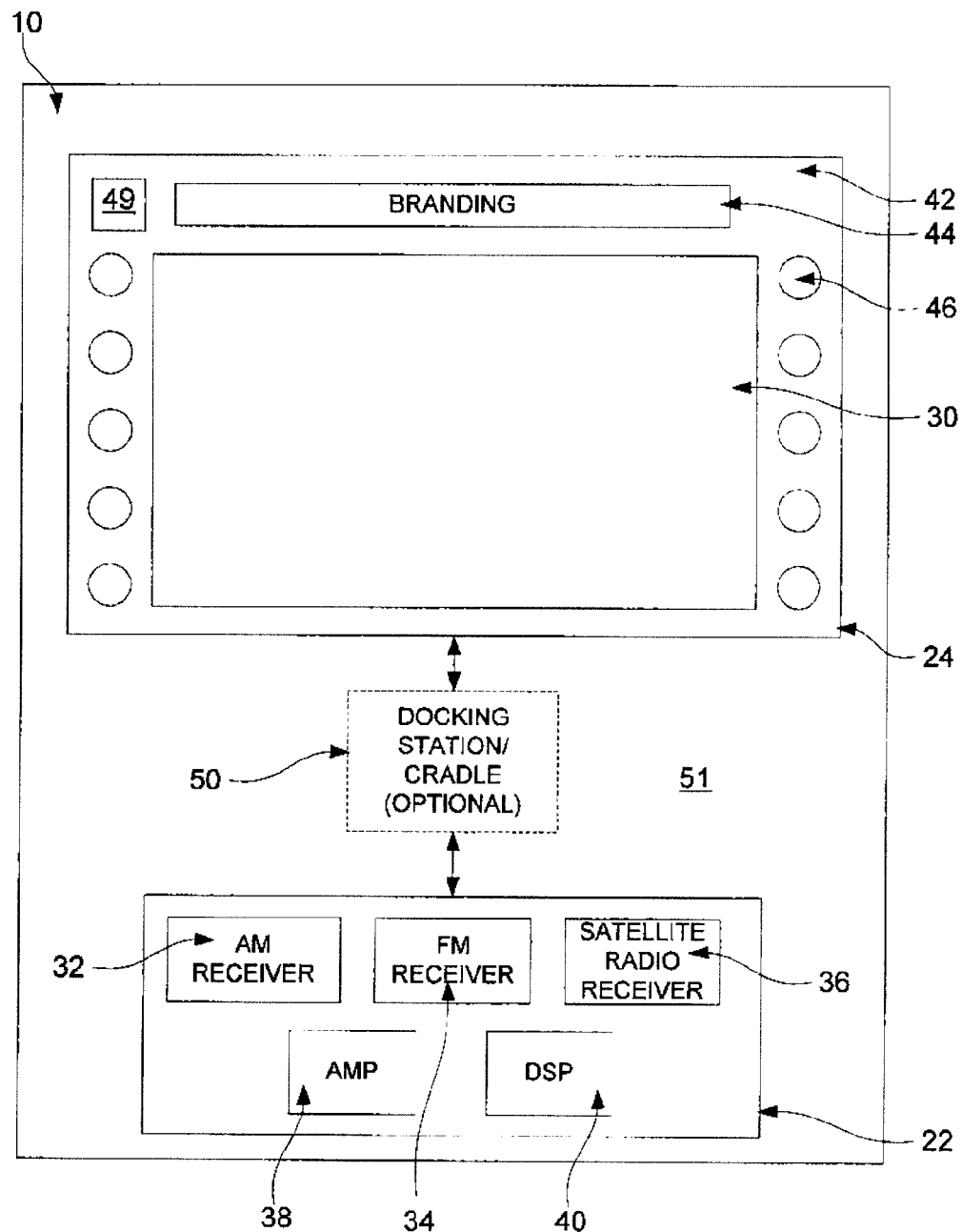
FIG. 4 is a diagram depicting even another example embodiment of the present invention.

In one embodiment, second module 24 may include one or more of the following features/functionalities:
  Wireless Connectivity (Wi-Fi, Cellular, WiMAX, etc.)
  Internet Browsing
  Internet Based PC Applications (e.g., GOOGLE® Applications)
  On Board Navigation with built in GPS (base map with routing)
  Off Board Navigation
  Location Based Services with 'Sponsor push" content
  Location Based Search Capability with "Driver pull" content
  Infotainment/Soft Media capability
  Active (GPS-based) Gaming
  E-mail (Text To Speech)
  Travel Assistance, Concierge Services
  Secure Personal Applications (e.g., Banking)
  Vertical Business Applications (e.g., Real Estate Agents)
  Personal Devices with Design, Brand, Style, Fashion Statements
  Exploring "NEW" on going Revenue Models In one embodiment (as depicted in FIG. 4, for example), second module 24 may include display device 30 to display communications/data. Display device 30 may be integrated with second module 24 (as depicted in FIG. 4, for example) and/or merely in communication with second module 24 (as depicted in FIG. 2, for example). Second module 24 may also include bezel 42 surrounding a face of display device 30. Bezel 42 may include branding indicia 44 (such as a company logo, trademark, slogan, advertisement, and/or the like) disposed on a face of bezel 42. Second module 24 may also display advertisements and/or sponsored content on display device 30. In one embodiment, second module 24 may include one or more hardware buttons 46 on bezel 42 to operate and/or actuate functions of second module 24. Additionally or alternatively, second module 24 may include one or more software buttons (not pictured) on bezel 42 to operate and/or actuate functions of second module 24. Second module 24 may include one or more audio speakers 49 to play audio content that may be associated with video content played on display device 30.

In one embodiment, second module 24 may be modular in nature such that second module 24 may be detached from vehicle media and communications system 10. In this manner, second module 24 may operate as a "standalone" device within or outside the vehicle. Further, in one embodiment, because second module 24 may be detached, second module 24 may be replaced with a new and/or upgraded module (featuring new, additional and/or improved features/functions). In one embodiment, second module 24 may be coupled to system 10 and/or first module 22 using a cradle/docking station 50. Cradle/docking station 50 may be permanently affixed to a hard plastic body 51 of system 10. In another embodiment, second module 24 may be integrated within system 10. Second module 24 may include a battery as a power source when second module 24 is detached from vehicle media and communications system 10. One embodiment allows for the storage of personalization parameters within second module 24. Personalization parameters may be associated with system 10 settings, preferences, states and/or shortcuts. In this manner, second module 24 may retain personalization parameters even when second module 24 is detached from system 10.

Figure 5:
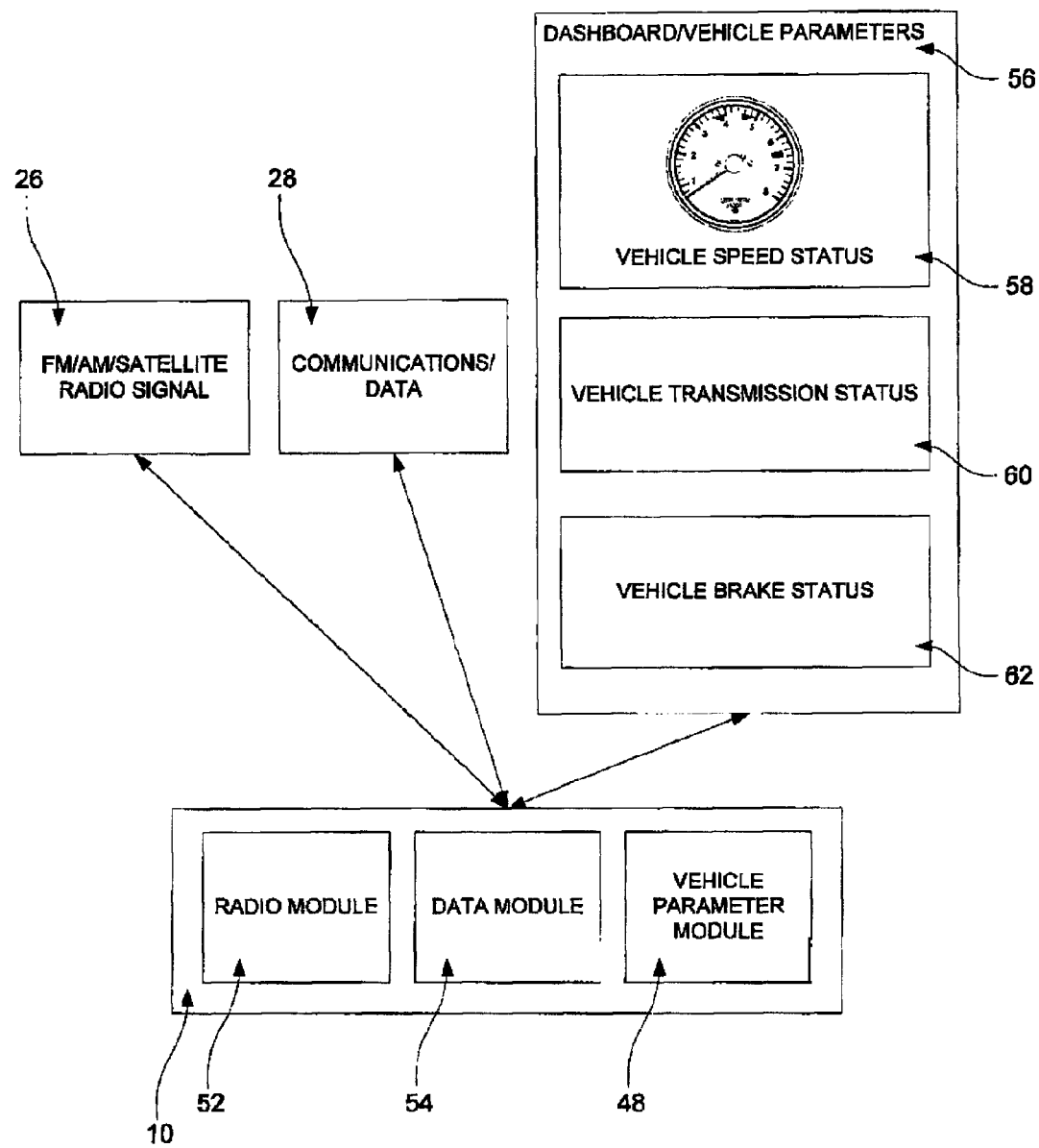
FIG. 5 is a diagram depicting yet another example embodiment of the present invention.

In one embodiment, system 10 may also include vehicle parameter module 48 (FIG. 5). Vehicle parameter module 48 may receive vehicle state parameters. Vehicle parameter module 48 may compare the received vehicle state parameters to predetermined vehicle state parameters. Example vehicle state parameters may include a vehicle speed parameter, a vehicle transmission parameter and/or a vehicle braking parameter, among others. Vehicle parameter module 48 may communicate with the second module to disallow outputting and/or display of communications/data based, at least in part, on the vehicle state parameters.

Figure 3:
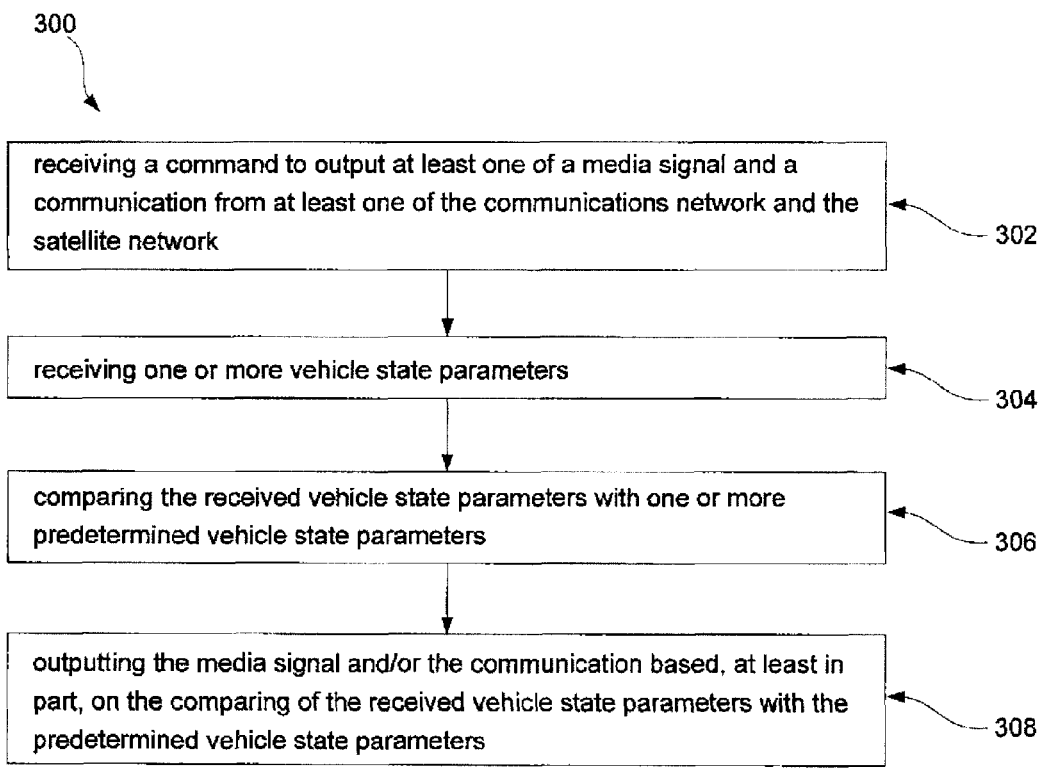
FIG. 3 is a flow diagram depicting an example embodiment of the present invention.

As depicted in FIG. 3, a method 300 of providing communications network and/or satellite network access in a vehicle is provided. Such a method may include processing operations 302, 304, 306 and/or 308. Beginning at operation 302, a command to output a media signal and/or communications/data from the communications network and/or the satellite network may be received. Operation 304 may include receiving vehicle state parameter(s). Continuing from operation 304, operation 306 may include comparing the received vehicle state parameter(s) with predetermined vehicle state parameter(s). At operation 308, the media signal and/or the communication/data may be outputted based, at least in part, on the comparing operation (operation 306).

Vehicle state parameters may include a vehicle speed parameter, a vehicle transmission parameter and/or a vehicle braking parameter, among others. In one embodiment, the comparing operation (operation 306) may include (i) comparing the vehicle speed parameter with a predetermined vehicle speed parameter, (ii) comparing the vehicle transmission parameter with a predetermined vehicle transmission parameter, and/or (iii) comparing the vehicle braking parameter with a predetermined vehicle braking parameter.

In one embodiment, a predetermined vehicle speed parameter may correspond to a vehicle speed of zero miles per hour (e.g., no vehicle speed or vehicle is not moving). A predetermined vehicle transmission parameter may correspond to a parked condition (e.g., the transmission is not in a forward, neutral and/or reverse condition). A predetermined vehicle braking parameter may correspond to vehicle brake engagement (e.g., the vehicle parking brake or foot brake is engaged and/or applied).

In an exemplary embodiment (as depicted in FIG. 5), a vehicle media and communications system 10 may be provided. System 10 may include radio module 52, data module 54 and/or vehicle parameter module 48. Radio module 52 may receive and/or output an FM signal 26, an AM signal 26 and/or a satellite radio signal 26, among others. Radio module 52 may also amplify and/or process the FM signal 26, the AM signal 26 and/or the satellite radio signal 26. Data module 54 may transmit to and/or receive communications data 28 from the Internet, a local area network (LAN), a wireless LAN (WLAN), a wide area network (WAN), a global area network (GAN), a wireless fidelity (Wi-Fi) network, a Worldwide Interoperability for Microwave Access (WiMAX) network, a Global System for Mobile (GSM) network, a code division multiple access (CDMA) network, a satellite communications network, a satellite video network and a global positioning system (GPS) network. Data module 54 may also output the data 28 on a display. In one embodiment, data module 54 may be detachably coupled to system 10.

In one embodiment, vehicle parameter module 48 may receive vehicle state parameters 56 and compare vehicle state parameters 56 to predetermined state parameters. Vehicle state parameters 56 may include vehicle speed parameter 58, vehicle transmission parameter 60 and/or vehicle braking parameter 62. Vehicle parameter module 48 may communicate with data module 54 to disallow outputting data 28 on the display based, at least in part, on vehicle state parameters 56.

In a specific embodiment, a dynamic human machine interface provides different levels of internet access depending upon the then-current state of parameters 56. More particularly, in order to prevent the driver from diverting so much of his attention to the internet that he cannot drive safely, only limited internet functionality may be provided when the vehicle is in motion, is being operated, or otherwise requires a relatively high portion of the driver's attention. For example, when the vehicle speed is zero, the vehicle transmission is in "park", and the hand brake is on, internet applications may be provided with full functionality. For example, the driver may be provided with full internet access with detailed information and no limitations on font size. However, if the vehicle speed is nonzero, the vehicle transmission is in drive, and/or the hand brake is off, then only limited internet functionality may be provided. The limitations on internet functionality may include putting a lower limit on the font size that can be displayed on the video screen. Thus, with only relatively large lettering ensured, the user can quickly read what is presented on the screen at a glance without having to view the screen for too long of an uninterrupted period of time. The limitations on internet functionality may also include allowing the driver to navigate the internet only by use of voice commands or, in a specific embodiment, previously established "voice tags", as described below.

A voice tag may enable a driver or other user to record internet navigation key strokes and record a spoken label in association with the series of key strokes. For example, a user may enter the internet access keystrokes corresponding to the web site for the Washington Post, and then save the keystrokes with the spoken voice command "Internet Voice Tag". The user may then save the keystrokes with the spoken voice command tag "Washington Post", or "Newspaper", or any other label that the user wishes to assign to the internet address. Later, when the user want to navigate to the washingtonpost.com web site, the user may speak "Internet", and after his internet home page is automatically accessed by the system, the user may then speak "Washington Post" to cause the system to automatically navigate to the washingtonpost.com web site.

To provide additional context for various aspects of the present invention, the following discussion is intended to provide a brief, general description of a suitable computing environment in which the various aspects of the invention may be implemented. While one embodiment of the invention relates to the general context of computer-executable instructions that may run on one or more computers, those skilled in the art will recognize that the invention also may be implemented in combination with other program modules and/or as a combination of hardware and software (including hardware and/or software of vehicle entertainment and/or information systems).

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, as well as personal computers, hand-held wireless computing devices, microprocessor-based or programmable consumer electronics (including vehicle entertainment and/or information systems) and the like, each of which can be operatively coupled to one or more associated devices. Aspects of the invention may also be practiced in distributed computing environments where certain tasks are performed by remote processing devices that are linked through a communications network. In a distributed computing environment, program modules may be located in both local and remote memory storage devices.

An exemplary environment for implementing various aspects of the invention may include a computer that includes a processing unit, a system memory and a system bus. The system bus couples system components including, but not limited to, the system memory to the processing unit. The processing unit may be any of various commercially available processors. Dual microprocessors and other multiprocessor architectures may also be employed as the processing unit.

The computer may further include an internal hard disk drive (HDD) (e.g., EIDE, SATA), which internal hard disk drive may also be configured for external use in a suitable chassis and/or an optical disk drive, (e.g., reading a CD-ROM disk or, to read from or write to other high capacity optical media such as the DVD). The hard disk drive and/or optical disk drive may be connected to the system bus by a hard disk drive interface and/or an optical drive interface, respectively. The interface for external drive implementations includes at least one or both of Universal Serial Bus (USB) and IEEE 1394 interface technologies.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD and a removable optical media such as a CD or DVD, it should be appreciated by those skilled in the art that other types of media which are readable by a computer may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as know to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Following from the above description and invention summaries, it should be apparent to those of ordinary skill in the art that, while the methods and apparatuses herein described constitute exemplary embodiments of the present invention, it is to be understood that the inventions contained herein are not limited to the above precise embodiment and that changes may be made without departing from the scope of the invention. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

What is claimed is:

1. A motor vehicle comprising a media and communications system, the media and communications system operably coupled to one or more media source having a media file and/or media signal, the media and communications system including:

a first module including at least one of a frequency modulation (FM) receiver, an amplitude modulation (AM) receiver and a satellite radio receiver, the first module being adapted to receive and output the media file and/or the media signal on a video display and/or audio speaker;
a removable second module adapted to:
   communicate with a network;
   output communications from the network on the video display and/or audio speaker; and
   store personalization parameters associated with at least one of vehicle media and communications system settings, vehicle media and communications system states and vehicle media and communications system shortcuts; and
a cradle/docking station detachably coupled to the second module.

2. The motor vehicle of claim 1, wherein the first module further comprises:
an amplification component adapted to amplify the media file and/or media signal; and
a digital signal processing component adapted to process the media file and/or media signal.

3. The motor vehicle of claim 1, wherein the first module is fixed.

4. The motor vehicle of claim 1, wherein the media file and/or media signal comprises at least one of an FM signal, an AM signal and a satellite radio signal.

5. The motor vehicle of claim 1, wherein the second module comprises at least one of a compact disc (CD) player, an MP3 player, a digital video disc (DVD) player, a high-definition video player, a wireless network adapter, a cellular network adapter, a satellite communications network adapter, a satellite video receiver and a global positioning system (GPS) receiver.

6. The motor vehicle of claim 1, wherein the network comprises at least one of the Internet, a local area network (LAN), a wireless LAN (WLAN), a wide area network (WAN), a global area network (GAN), a wireless fidelity (Wi-Fi) network, a Worldwide Interoperability for Microwave Access (WiMAX) network, a Global System for Mobile (GSM) network, a code division multiple access (CDMA) network.

7. The motor vehicle of claim 1, wherein the network comprises at least one of a satellite communications network, a satellite video network and a GPS network.

8. The motor vehicle of claim 1, wherein the second module comprises:
a display device adapted to display the communications from the network; and
a battery adapted to provide power to the second module when the second module is detached from the media and communications system.

9. The motor vehicle of claim 8, wherein the second module further comprises a bezel surrounding a face of the display device, the bezel having a branding indicium disposed on a face of the bezel, and the second module is further adapted to display at least one of advertisements and sponsored content on the display device.

10. The motor vehicle of claim 1, wherein the cradle/docking station is permanently affixed to a body of the media and communications system.

11. The motor vehicle of claim 1, further comprising:
a vehicle parameter module adapted to receive one or more vehicle state parameters, the vehicle state parameters comprising at least one of a vehicle speed parameter, a vehicle transmission parameter and a vehicle braking parameter;
wherein the vehicle parameter module communicates with the second module to disallow outputting communications from the network based, at least in part, on the vehicle state parameters.

12. A method of providing communications network and/or satellite network access in a vehicle, the method comprising the following steps performed within the vehicle:
receiving a command to output at least one of a media signal and a communication, the command being received from outside the vehicle;
receiving one or more vehicle state parameters;
comparing the received vehicle state parameters with one or more predetermined vehicle state parameters; and
outputting the media signal and/or the communication based, at least in part, on the comparing of the received vehicle state parameters with the predetermined vehicle state parameters.

13. The method of claim 12, wherein the vehicle state parameters comprise at least one of a vehicle speed parameter, a vehicle transmission parameter and a vehicle braking parameter.

14. The method of claim 13, wherein comparing the received vehicle state parameters with one or more predetermined vehicle state parameters further includes at least one of: (i) comparing the vehicle speed parameter with a predetermined vehicle speed parameter (ii) comparing the vehicle transmission parameter with a predetermined vehicle transmission parameter; and (iii) comparing the vehicle braking parameter with a predetermined vehicle braking parameter.

15. The method of claim 13, wherein the command is from at least one of the communications network and the satellite network, and the predetermined vehicle state parameters comprise at least one of a predetermined vehicle speed parameter, a predetermined vehicle transmission parameter and a predetermined vehicle braking parameter; and wherein the predetermined vehicle speed parameter corresponds to a vehicle speed of zero miles per hour, the predetermined vehicle transmission parameter corresponds to a parked condition, and the predetermined vehicle braking parameter corresponds to a vehicle brake engagement.

16. The method of claim 12, wherein the command is from at least one of the communications network and the satellite network, and the outputting step includes displaying the media signal and/or the communication with a font that is dependent on the comparing of the received vehicle state parameters with the predetermined vehicle state parameters.

17. The method of claim 16, wherein the outputting step includes displaying the media signal and/or the communication with a lower limit on a size of the font if the vehicle speed is nonzero, the vehicle transmission is in drive, or the hand brake is off, and displaying the media signal and/or the communication with no lower limit on the size of the font if the vehicle speed is zero, the vehicle transmission is not in drive, and the hand brake is on.

18. The method of claim 12, wherein the command is from at least one of the communications network and the satellite network, the method comprising the further step of controlling which of two levels of internet access that the driver is provided with, the controlling being based, at least in part, on the comparing of the received vehicle state parameters with the predetermined vehicle state parameters, a first of the two levels of internet access comprising allowing the driver to navigate the internet by use of both voice commands and keystrokes, a second of the two levels of internet access comprising allowing the driver to navigate the internet only by use of voice commands.

19. The method of claim 18, wherein the driver is provided with the second level of internet access if the vehicle speed is nonzero or the vehicle transmission is in drive, and the driver is provided with the first level of internet access if the vehicle speed is zero and the vehicle transmission is not in drive.

20. A motor vehicle including a media and communications system, the media and communications system comprising:
- a body;
- a radio module coupled to the body and adapted to receive and output at least one of a frequency modulation (FM) signal, an amplitude modulation (AM) signal and a satellite radio signal, the radio module further adapted to amplify and process the FM signal, the AM signal and/or the satellite radio signal;
- a data module detachably coupled to the body and adapted to transmit to and receive data from at least one of the Internet, a local area network (LAN), a wireless LAN (WLAN), a wide area network (WAN), a global area network (GAN), a wireless fidelity (Wi-Fi) network, a Worldwide Interoperability for Microwave Access (WIMAX) network, a Global System for Mobile (GSM) network, a code division multiple access (CDMA) network, a satellite communications network, a satellite video network and a global positioning system (GPS) network, and further adapted to output the data on a display; and
- a vehicle parameter module adapted to receive one or more vehicle state parameters and further adapted to compare the vehicle state parameters to one or more predetermined state parameters, the vehicle state parameters comprising at least one of a vehicle speed parameter, a vehicle transmission parameter and a vehicle braking parameter, wherein the vehicle parameter module communicates with the data module to disallow outputting data on the display based, at least in part, on the vehicle state parameters.

\* \* \* \* \*